United States Patent [19]
Cunningham

[11] Patent Number: 5,893,389
[45] Date of Patent: Apr. 13, 1999

[54] METAL SEALS FOR CHECK VALVES

[75] Inventor: Christopher E. Cunningham, Spring, Tex.

[73] Assignee: FMC Corporation, Chicago, Ill.

[21] Appl. No.: 09/088,627

[22] Filed: Jun. 2, 1998

Related U.S. Application Data

[60] Provisional application No. 60/055,180, Aug. 8, 1997.
[51] Int. Cl.⁶ .......................... F16K 15/00; F16K 31/00
[52] U.S. Cl. ..................... 137/516.27; 137/516.29; 251/359
[58] Field of Search .................. 137/516.27 O, 137/516.29; 251/364, 359, 352; 277/647

[56] References Cited

U.S. PATENT DOCUMENTS

| | | | |
|---|---|---|---|
| 2,481,713 | 9/1949 | Bertea | 137/516.27 |
| 2,900,999 | 8/1959 | Courtot | 137/516.27 |
| 3,054,422 | 9/1962 | Napolitano | 137/516.27 |
| 4,113,268 | 9/1978 | Simmons et al. | 277/647 |
| 4,532,958 | 8/1985 | Napolitano | 137/516.27 |
| 4,821,954 | 4/1989 | Bowder | 251/359 |

*Primary Examiner*—Henry Bennett
*Assistant Examiner*—Joanne Y. Kim
*Attorney, Agent, or Firm*—Bush, Riddle & Jackson L.L.P.

[57] ABSTRACT

A poppet check valve (20) in the embodiment of FIG. 1 has a valve body (30) with a fixed unyielding metal seat (38) for engaging in metal-to-metal sealing contact with a sealing surface (48) on poppet valve member (34) at relatively high fluid pressure ranges. The metal seats 38 and 48 may both be frusto-conical in shape or one frusto-conical and the other spherical. A compliant metal sealing member (42) engages sealing surface (48) in metal-to-metal sealing relation at low fluid pressures prior to engagement of sealing surface (48) with fixed metal seat (38) at high fluid pressures. Alternative embodiments are shown in FIGS. 3–7. The embodiment of FIG. 7 shows a poppet check valve with a pair of staged flexible metal sealing members (42D, 43D) which are integral with body (30D) for progressively engaging the sealing surface (48D) of poppet valve member (34D) prior to engagement of fixed metal seat (38D).

19 Claims, 2 Drawing Sheets

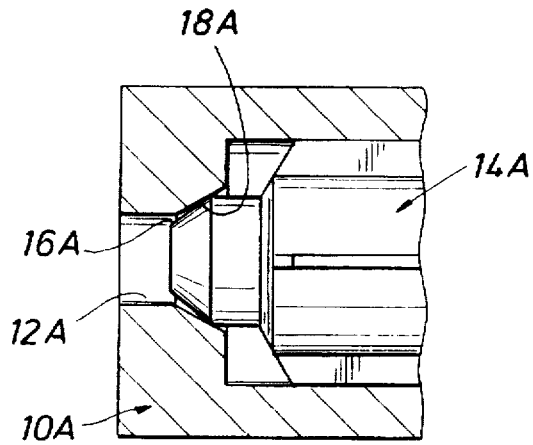
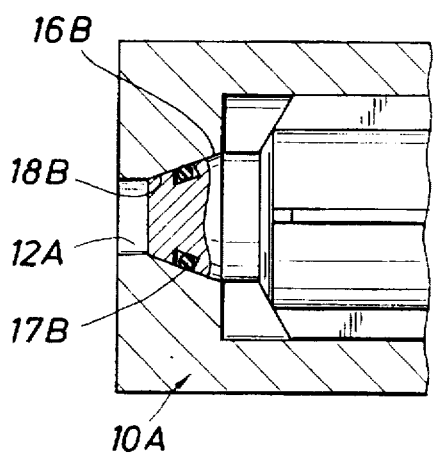
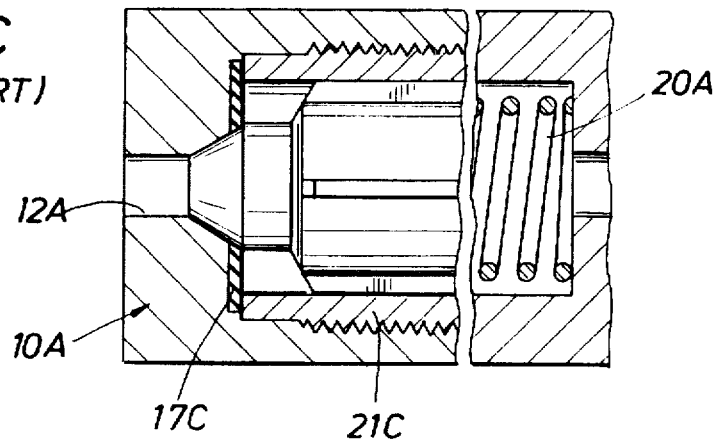
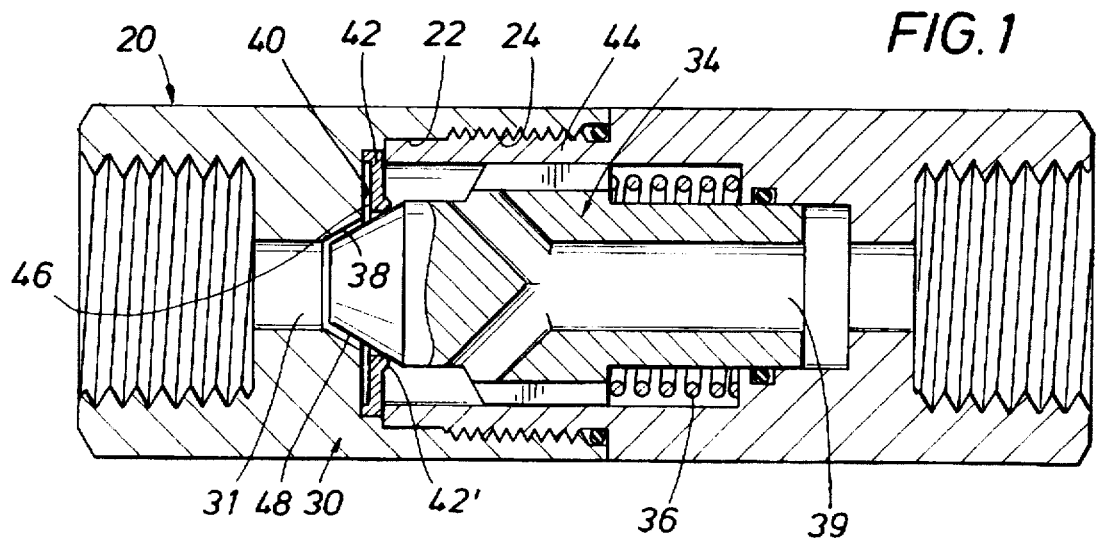

METAL SEALS FOR CHECK VALVES

RELATED APPLICATION

This application claims priority from Provisional Application 60/055,180 filed Aug. 8, 1997.

BACKGROUND OF THE INVENTION

1. Field of the Invention

This invention relates to check valves providing metal-to-metal sealing, and more particularly to a metal seal or sealing structure for a check valve effective for sealing at both low fluid pressures and at high fluid pressures over a wide differential pressure range.

2. Description of Prior Art

Heretofore, check valves have been provided with metal seals or metal sealing arrangements. While many of the prior art metal sealing structures are effective for sealing at either high or low fluid pressures, it has been found that most of such metal sealing structures are not very effective at both high and low fluid pressures.

Typical prior art metal sealing arrangements for check valves are illustrated in FIGS. 1A, 1B and 1C. FIG. 1A illustrates the "differential angle" sealing principle. In this design, the sealing faces theoretically engage one another as a continuous point contact around the circumference of a circle rather than as a conical face as would be the case if the mating face angles matched. Low pressure sealing is achieved since appropriately high contact stresses can be generated even by a relatively small force, such as can be generated by a mechanical spring and/or low pressure. The drawback of the design shown in FIG. 1A is that at higher pressure, the force generated on the contact faces is great enough to permanently yield/deform them. An effective "fit" is created between the mating parts as a result of this process (typically referred to as "coining"), and a very good "high" pressure seal is also achieved, but the contact area is also increased. With the bearing area thus increased, the amount of force required to generate sufficient contact stress to ensure a seal is also increased, typically beyond the capacity of the mechanical device (typically a spring), provided to generate the low pressure seal. This design is simple and cost effective to manufacture and can be used for low or high pressures (but not both in the same application). Specifically, repeatable low pressure sealing is typically lost once high pressure is applied.

Oil field applications for check valves vary widely. The application which tends to create the most problems seems to be related to Christmas trees where the check valves are often used as one of the two "fail close" barriers required by code for isolation of chemical injection ports. In this application, the check valves must seal repeatedly any differential pressure above ambient and up to the rated maximum working pressure of the system to which they are attached. This is a range of up to 15,000 psi or more.

FIGS. 1B and 1C illustrate two configurations of a principle which might be referred to as the "soft seat/hard seat" sealing principle. Both concepts incorporate a relatively soft, easily deformable element to provide the low pressure seal and a shouldering interface providing a higher pressure metal seal. As pressure is increased across the poppet or check valve member in these designs (in their intended sealing direction), the soft seat sealing elements are progressively deformed until the poppet contacts the body seat. The soft seat most likely continues to provide sealing integrity throughout the operational pressure range, although it has been demonstrated for most designs that a true metal-to-metal seal is also achieved at higher pressures (i.e., once metal contact stresses have reached the minimum critical level to initiate a seal). The soft seats shown in FIGS. 1B and 1C are "resilient" in the sense that so long as they are not deformed beyond certain material-specific limits (as ensured by the shouldering of the metal contact faces) they will return substantially to its pre-deformed geometry. This gives these check valves the ability to provide repeatable low pressure sealing. The metal "shoulder" provides repeatable higher pressure sealing (although the metal sealing "range" is limited as is the case for the "differential angle" design shown in FIG. 1A). A disadvantage of the combined soft seat/hard seat designs is the necessity of a non-metallic low pressure sealing element, which is undesirable for some end users of check valves, particularly where high temperatures are involved or where the valves are exposed to harmful chemicals.

It is an object of the present invention to provide a metal sealing arrangement for a check valve which provides staged sealing for operation over a wide differential pressure range with a relatively long life.

SUMMARY OF THE INVENTION

The present invention is directed to a metal sealing structure for a check valve in which a compliant metal seal ring or element is integral or separately secured to a check valve body in such a way that it can elastically deform upon contact with the check valve poppet. The metal sealing ring provides staged sealing so that one or more low pressure metal seals are progressively deformed or deflected within their elastic range(s) until a fixed stop shoulder or abutment on the valve body is contacted, simultaneously halting poppet translation and energizing the high pressure seal. Various metal sealing structures or designs may be provided which embody the present invention.

The designs shown in the drawings as described below illustrate various preferred embodiments. Other embodiments could be utilized in achieving the present invention.

BRIEF DESCRIPTION OF THE DRAWINGS

The objects, advantages and features of the invention will become more apparent by reference to the drawings which are appended hereto and wherein an illustrative embodiment of the invention is shown, of which:

FIGS. 1A, 1B and 1C are examples of prior art metal sealing designs as described above;

FIGS. 1 and 2 are sectional views of one embodiment of the present invention in which a compliant metal seal ring is mounted in the valve body for deflecting upon contact with the check valve poppet member;

DESCRIPTION OF PRIOR ART

Referring to FIGS. 1A, 1B and 1C in which examples of prior art metal sealing designs for check valves are illustrated, a valve body is shown generally at 10A having a flow passage and a port 12A. A check valve poppet member 14A of FIG. 1A has a sealing surface 16A adapted for contacting mating fixed sealing surface 18A on body 10A to provide metal-to-metal sealing between surfaces 16A and 18A. The "cone" angles of sealing surfaces 16A and 18A are different so as to define the respective contact areas. A spring 20A continuously urges valve poppet member 14A to a closed position. The design shown in FIG. 1B has typically matched-angled conical tapered sealing surfaces 16B and 18B with a soft seal 17B therebetween. In FIG. 1C, a soft seat disc 17C is secured by an externally threaded retaining sleeve 21C on outer body 10A.

DESCRIPTION OF THE PRESENT INVENTION

Figure 2:
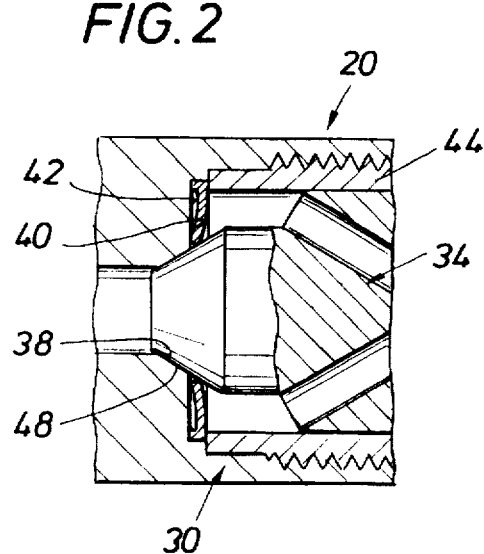

Referring first to the embodiment of FIGS. 1 and 2, a poppet-type check valve is shown generally at 20 having a valve body 30 with a bore 22 internally threaded at 24. A check valve poppet member 34 is continuously urged by spring 36 toward tapered seat 38 on valve body 30. An annular abutment or shoulder 40 on valve body 30 is provided adjacent seat 38. An end flow passage 31 is provided on one end of valve body 30, and flow passage 39 is provided adjacent the other end of poppet member 34. A metal seat or sealing ring 42 is mounted on body 30 by externally threaded retainer sleeve 44 which engages threaded bore portion 24 to compress the base of ring or disc 42 against shoulder 40 so as to seal the base with respect to body 30 and to provide one of several alternative means for creating clearance or space 46 between ring 42 and shoulder 40. Ring or disc 42 may alternatively achieve its seal to body 30 by way of a "press fit". Shoulder 40 extends radially outwardly of fixed frusto-conical seat 38. Check valve member 34 has a frusto-conical end sealing surface 48 for contacting metal sealing ring 42 in sealing relation. The metal sealing ring 42 may also be called a "lip" which may have a radiused bump 42' at its end for contacting sealing surface 48. Although the sealing surfaces 48 of the poppet valve member 34 and 38 of the valve body are illustrated as both being of frusto-conical shape, one or the other of them may be of spherical shape. That is, the surface 48 may be spherical in shape to seal with a frusto-conical shaped sealing surface 38 and vice versa.

FIG. 1 shows sealing contact of check valve poppet member 34 against sealing ring 42 under a relatively low fluid pressure. FIG. 2 shows the position of check valve poppet member 34 under a relatively high fluid pressure with tapered metal surfaces 38 and 48 in mating metal-to-metal contact. Sealing ring 42 may or may not be in contact with shoulder 40. However, sealing ring 42 is arranged and designed so that when it is deformed as illustrated in FIG. 2, it is not subjected to significant permanent deformation under maximum design pressure conditions. In other words, when the pressure is relieved, the sealing ring 42 returns substantially to its low pressure condition as illustrated in FIG. 1.

Figure 3:
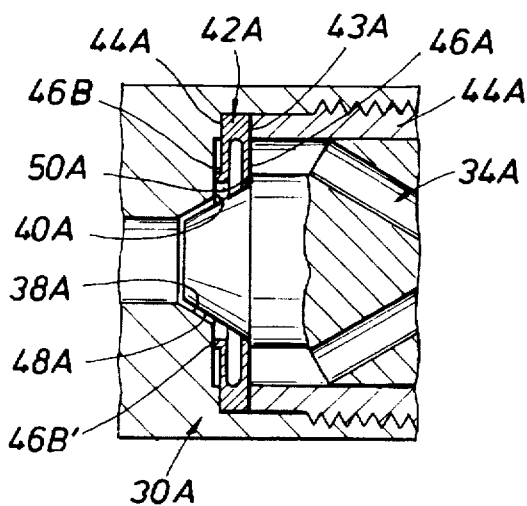
FIGS. 3 and 4 are sectional views of another embodiment of a compliant metal seal ring having a base and a pair of spaced inner and outer fingers, one of which is deflectable, the other of which bears against a shoulder.
Figure 4:
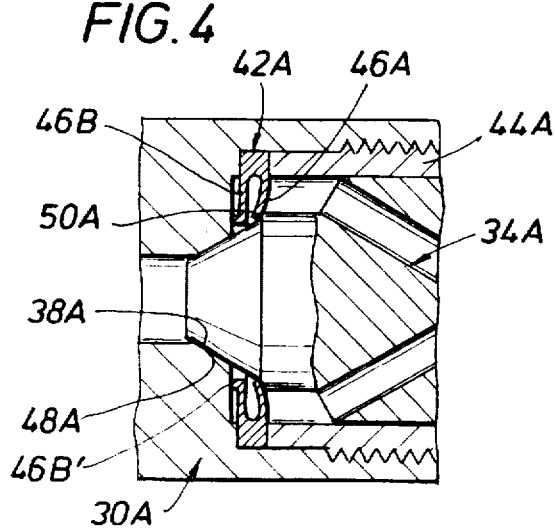

FIGS. 3 and 4 illustrate a further embodiment of the invention in which a metal sealing ring 42A has a base 43A which is mounted against annular surface 41A and secured against surface 41A by retainer sleeve 44A. Base 43A has a pair of compliant or flexible flanges or fingers or "lips" 46A, 46B which extend radially inward therefrom. The end of finger 46A is arranged and designed for sealing against an outer annular sealing surface 50A which is provided on check valve poppet member 34A. Like the lip or finger 42 of FIGS. 1 and 2, the end of lip or finger 46A may include a radiused bump (not illustrated) for optimum sealing contact with surface 48A over a range of pressure conditions. Base 43A may not be sufficiently squeezed by retainer sleeve 44A to seal it with respect to surface 41A. Therefore, the end finger of 46B may have an axial tab 46B for sealing against shoulder 40A. Alternatively, seal ring 42A may seal to body 30A by way of a "press fit".

Mating tapered sealing surfaces 38A and 48A are provided on respective body 30A and check valve poppet member 34A. FIG. 3 shows the position of check valve poppet member 34A for a low fluid pressure condition. Under low pressure conditions, sealing is effected by sealing contact of the end of finger 46A and sealing surface 50A of check valve poppet member 34A. FIG. 4 shows the position of check valve poppet member 34A and metal seal 42A under a high fluid pressure condition. Under high fluid pressure conditions, sealing is effected by sealing contact of surfaces 48A and 38A, and by sealing contact of the end of flexible finger 46A with sealing surface 50A. Notice the (exaggerated) flexing of finger 46A under high pressure sealing conditions.

Figure 5:
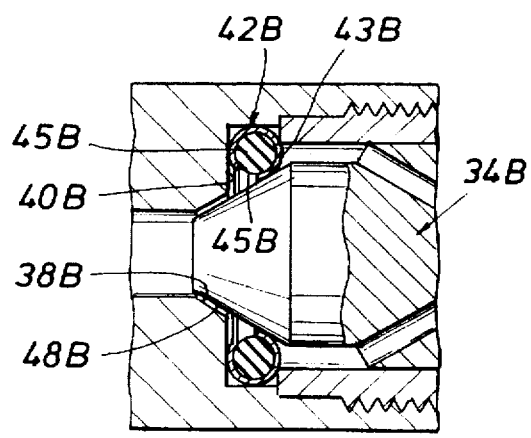
FIG. 5 is a sectional view of a further embodiment of the present invention in which the metal sealing element comprises an outer C-shaped metal jacket which surrounds a resilient energizing element such as elastomeric material or even a coiled metallic element, etc.

FIG. 5 illustrates a further embodiment of the invention in which the metal seal element or ring 42B includes an outer C-shaped metal jacket or sleeve 43B having an inner resilient element 45B therein. The resilient element 45B may be one of several resilient energizing materials such as rubber, plastic, coiled metal, etc. Such a "metal O-ring" is available from Advanced Products Co. or a similar manufacturer. Ring 42B is sealed against shoulder 40B by retainer sleeve 44B and/or radial interference with the internal bore of body 30. Tapered sealing surface 48B on check valve poppet element 34B engages outer C-shaped jacket 43B as shown in FIG. 5 under a low fluid pressure condition. Under high pressure conditions (not illustrated) the surfaces 38B and 48B are in sealing contact while ring 42B is compressed with metal jacket 43B also continuing to seal against sealing surface 48B of check valve poppet member 34B. The jacket 43B flexes under high pressure conditions to provide further sealing capability under high pressure conditions. The resilient inner core 45B provides a resilient returning force to thin metal jacket 43B.

Figure 6:
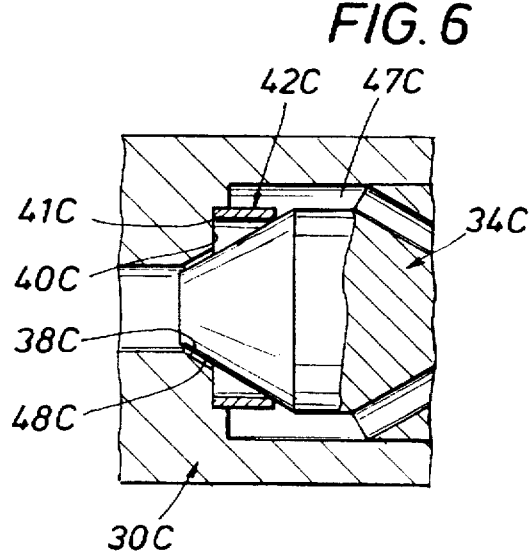
FIG. 6 is a sectional view of an additional embodiment of the present invention in which a metal sealing ring is mounted for deflecting radially outward upon contact with the check valve poppet member.

FIG. 6 shows another embodiment of the invention in which a metal sealing element 42C extends in a direction substantially parallel to the flow passage and is secured, such as by press fit or weld, etc., for sealing contact with shoulder 40C and/or bore 41C and is positioned against intermediate peripheral surface 41C of valve body 30C in a cantilevered relation. Tapered sealing surface 48C of check valve poppet member 34C contacts metal seal ring 42C under low fluid pressure relation as shown in FIG. 6. Under a high fluid pressure condition, tapered seat surface 38C on valve body 30C contacts tapered sealing surface 48C on check valve poppet member 34C, and simultaneously, metal seal ring 42C continues to contact sealing surface 48C while bending or flexing radially outwardly into space 47C.

Figure 7:
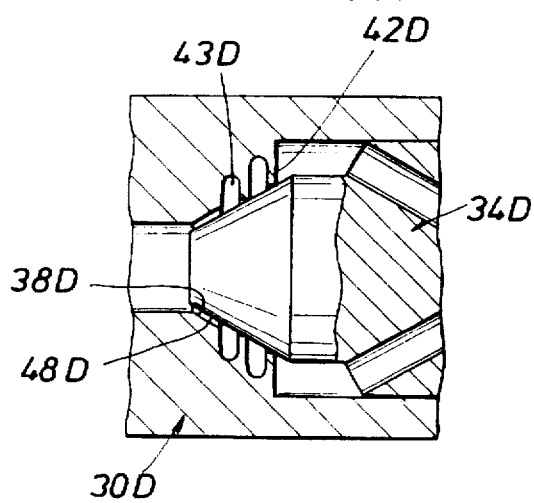
FIG. 7 is a sectional view of another embodiment of the present invention in which a pair of deflectable lips, which are integral with the valve body, provide deflectable metal seats for progressively engaging the check valve member in a staged or sequential manner.

Referring to FIG. 7, a still further embodiment of the invention is shown in which metal check valve body 30D has a fixed frusto-conical metal seat 38D, and a poppet check valve member 34D has a tapered sealing surface 48D for contacting fixed metal seat 38D at relatively high fluid pressures. Body 30D has a pair of integral metal lips or fingers 42D and 43D which extend radially inward from body 30D adjacent fixed seat 38D. Lips 42D and 43D are arranged in a staged relation so that lip 42D contacts tapered sealing surface 48D at a low fluid pressure prior to contact of lip 43D with sealing surface 48D. With a further increase in fluid pressure acting against poppet valve member 34D to an intermediate fluid pressure range, lip 43D contacts sealing surface 48D of poppet valve member 34D. Upon a still further increase in fluid pressure to a high fluid pressure range, fixed seat 38D is contacted by surface 48D of poppet valve member 34D with lips 42D and 43D remaining in metal-to-metal sealing contact with sealing surface 48D. A range of one to several lips (e.g., two, three, four, etc.) can be used to suit the requirements of specific applications.

Under specific circumstances, it is desirable for "wide pressure range" applications to "stack" multiple low pressure sealing elements of the types illustrated in the figures, and particularly in FIG. 7, that are engaged in stages. While only two compliant metal sealing seats 42D, 43D are shown in FIG. 7 adjacent a fixed metal seat 38D, additional staged metal sealing seats can be provided, if desired. The most compliant element, such as lip 42D shown in FIG. 7, is energized for effective low pressure sealing. Then, higher pressure causes substantial elastic deflection of that element to the point that one or more subsequent compliant elements such as lip 43D with surface 48D are engaged. The end stop surfaces formed by fixed metal seat 38D and surface 48D defines a seal with the highest rated repeatable sealing pressure.

The above examples are not intended to represent all available sealing options, but rather only illustrate the principle of the invention. Many other variations can be conceived for the low pressure and high pressure metal seals covered by the subject invention. Similarly, the applications for "wide pressure range capable" metal sealing check valves such as envisioned by the subject invention are perceived to be practically unlimited.

While preferred embodiments of the present invention have been illustrated in detail, it is apparent that modifications and adaptions of the preferred embodiments will occur to those skilled in the art. However, it is to be expressly understood that such modifications and adaptations are within the spirit and scope of the present invention.

What is claimed is:

1. A poppet check valve comprising:
    a valve body having a bore with a flow passage therethrough and a fixed unyielding metal valve body seat about said flow passage;
    a poppet check valve member mounted within the bore of said valve body for movement between open and closed positions relative to said flow passage;
    means for continuously urging said check valve member toward a sealed position on said valve body seat;
    said poppet check valve member having a metal poppet valve sealing surface arranged to engage said valve body seat in metal-to-metal sealing relation at a relatively high fluid pressure range;
    a primary compliant metal sealing member carried by said valve body and positioned about said flow passage adjacent said valve body seat and arranged and designed for non-flexing contact with said poppet valve sealing surface in metal-to-metal sealing relation prior to contact of said poppet valve sealing surface against said valve body seat to provide primary metal-to-metal sealing at a relatively lower fluid pressure range and with enhanced metal-to-metal sealing at a relatively higher fluid pressure range with compliant sealing member deflection while sealing against said poppet valve sealing surface as closing fluid pressure is increased, and wherein said compliant sealing member is designed and arranged to return substantially to said non-flexing contact with said poppet valve at said relatively lower fluid pressure range; and
    said valve body having an annular shoulder which extends radially outward of said valve body seat, said compliant metal sealing member including a flexible disc which extends radially inward from said body in a spaced lapped relation to said shoulder, said deflection of said flexible disc being limited by stopping of said poppet check valve member against said valve body seat.

2. A poppet check valve comprising:
    a valve body having a bore with a flow passage therethrough and a fixed unyielding metal valve body seat about said flow passage;
    a poppet check valve member mounted within the bore of said valve body for movement between open and closed positions relative to said flow passage;
    means for continuously urging said check valve member toward a sealed position on said valve body seat;
    said poppet check valve member having a metal poppet valve sealing surface arranged to engage said valve body seat in metal-to-metal sealing relation at a relatively high fluid pressure range;
    a primary compliant metal sealing member carried by said valve body and positioned about said flow passage adjacent said valve body seat and arranged and designed for non-flexing contact with said poppet valve sealing surface in metal-to-metal sealing relation prior to contact of said poppet valve sealing surface against said valve body seat to provide primary metal-to-metal sealing at a relatively lower fluid pressure range and with enhanced metal-to-metal sealing at a relatively higher fluid pressure range with compliant sealing member deflection while sealing against said poppet valve sealing surface as closing fluid pressure is increased, and wherein said compliant sealing member is designed and arranged to return substantially to said non-flexing contact with said poppet valve at said relatively lower fluid pressure range; and
    said compliant metal sealing member comprising a lip which extends generally radially inward from said body.

3. The poppet check valve of claim 2 wherein,
said compliant metal sealing member has a base which is sealed with respect to said valve body.

4. The poppet check valve of claim 2 wherein,
said lip has a radiused bump at its end for sealing contact with said poppet valve sealing surface.

5. The poppet check valve of claim 4 wherein,
said lip is integral with said body.

6. The poppet check valve of claim 2 wherein,
said lip is integral with said body.

7. A poppet check valve comprising:
    a valve body having a bore with a flow passage therethrough and a fixed unyielding metal valve body seat about said flow passage;
    a poppet check valve member mounted within the bore of said valve body for movement between open and closed positions relative to said flow passage;
    means for continuously urging said check valve member toward a sealed position on said valve body seat;

said poppet check valve member having a metal poppet valve sealing surface arranged to engage said valve body seat in metal-to-metal sealing relation at a relatively high fluid pressure range;

a primary compliant metal sealing member carried by said valve body and positioned about said flow passage adjacent said valve body seat and arranged and designed for non-flexing contact with said poppet valve sealing surface in metal-to-metal sealing relation prior to contact of said poppet valve sealing surface against said valve body seat to provide primary metal-to-metal sealing at a relatively lower fluid pressure range and with enhanced metal-to-metal sealing at a relatively higher fluid pressure range with compliant sealing member deflection while sealing against said poppet valve sealing surface as closing fluid pressure is increased, and wherein said compliant sealing member is designed and arranged to return substantially to said non-flexing contact with said poppet valve at said relatively lower fluid pressure range; and a secondary compliant flexible metal sealing member carried by said valve body and positioned about said flow passage adjacent said valve body seat and arranged and designed to contact said poppet valve sealing surface in metal-to-metal sealing relation, as closing fluid pressure on said poppet check valve increases, prior to contact of said poppet valve sealing surface against said valve body seat but after said primary compliant metal sealing member engages said poppet valve sealing surface in a spaced sealing relation to said secondary compliant sealing member.

8. The poppet check valve of claim 7 wherein, said primary compliant metal sealing member and said secondary compliant metal sealing member each include a lip which extends generally radially inward from said body.

9. The poppet check valve of claim 8 wherein, said lips have radiused bumps at their ends which are arranged and designed for sealing contact with said poppet valve sealing surface.

10. The poppet check valve of claim 9 wherein, said lips are integral with said body and extend radially in parallel spaced relation to each other.

11. The poppet check valve of claim 8 wherein, said lips are integral with said body and extend radially in parallel spaced relation to each other.

12. The poppet check valve of claim 7 wherein, said primary compliant metal sealing member and said secondary compliant metal sealing members have a common base which is sealed with respect to said valve body.

13. A poppet check valve comprising:

a valve body having a bore with a flow passage therethrough and a fixed unyielding metal valve body seat about said flow passage;

a poppet check valve member mounted within the bore of said valve body for movement between open and closed positions relative to said flow passage;

means for continuously urging said check valve member toward a sealed position on said valve body seat;

said poppet check valve member having a metal poppet valve sealing surface arranged to engage said valve body seat in metal-to-metal sealing relation at a relatively high fluid pressure range;

a primary compliant metal sealing member carried by said valve body and positioned about said flow passage adjacent said valve body seat and arranged and designed for non-flexing contact with said poppet valve sealing surface in metal-to-metal sealing relation prior to contact of said poppet valve sealing surface against said valve body seat to provide primary metal-to-metal sealing at a relatively lower fluid pressure range and with enhanced metal-to-metal sealing at a relatively higher fluid pressure range with compliant sealing member deflection while sealing against said poppet valve sealing surface as closing fluid pressure is increased, and wherein said compliant sealing member is designed and arranged to return substantially to said non-flexing contact with said poppet valve at said relatively lower fluid pressure range; and said primary compliant metal sealing member comprising a C-ring which includes an outer C-shaped metal jacket and an inner elastic annular member within said C-shaped metal jacket for providing flexibility to said metal jacket.

14. The poppet check valve of claim 13 wherein, said C-ring is sealed with respect to said valve body.

15. A poppet check valve comprising:

a valve body having a flow passage, a fixed metal valve body seat about said flow passage, and an annular shoulder which extends radially outward of said fixed metal seat;

a poppet check valve member mounted on said body for movement between open and closed positions relative to said flow passage;

means for continuously urging said check valve member toward a closed seated position on said fixed metal valve body seat;

said poppet check valve member having a sealing surface which engages said metal valve body seat in metal-to-metal sealing relation at a high fluid pressure;

and a compliant metal sealing member positioned radially outward of said valve body seat adjacent said annular shoulder to contact said sealing surface on said check valve member in metal-to-metal sealing relation prior to contact of said tapered sealing surface with said valve body seat to provide sealing at relatively low fluid pressure; and said compliant sealing member comprising a ring having one end sealed with respect to said valve body and an opposite end for contacting said sealing surface on said check valve member.

16. A poppet check valve comprising:

a valve body having a flow passage, a fixed metal valve body seat about said flow passage, and an annular shoulder which extends radially outward of said fixed metal seat;

a poppet check valve member mounted on said body for movement between open and closed positions relative to said flow passage;

means for continuously urging said check valve member toward a closed seated position on said fixed metal valve body seat;

said poppet check valve member having a sealing surface which engages said metal valve body seat in metal-to-metal sealing relation at a high fluid pressure;

and a compliant metal sealing member positioned radially outward of said valve body seat adjacent said annular shoulder to contact said sealing surface on said check valve member in metal-to-metal sealing relation prior to contact of said tapered sealing surface with said valve body seat to provide sealing at relatively low fluid pressure; and said compliant metal sealing member comprising a lip which extends generally radially inward from said body in a lapping spaced relation to said annular shoulder.

17. The poppet check valve of claim 16 wherein, said lip has a radiused bump at its end for sealing contact with said poppet valve sealing surface.

18. A poppet check valve comprising:

a valve body having a flow passage, a fixed metal valve body seat about said flow passage, and an annular shoulder which extends radially outward of said fixed metal seat;

a poppet check valve member mounted on said body for movement between open and closed positions relative to said flow passage;

means for continuously urging said check valve member toward a closed seated position on said fixed metal valve body seat;

said poppet check valve member having a sealing surface which engages said metal valve body seat in metal-to-metal sealing relation at a high fluid pressure;

and a compliant metal sealing member positioned radially outward of said valve body seat adjacent said annular shoulder to contact said sealing surface on said check valve member in metal-to-metal sealing relation prior to contact of said tapered sealing surface with said valve body seat to provide sealing at relatively low fluid pressure; and said elastic metal seat comprising a C-ring which includes an outer C-shaped metal jacket and an inner resilient annular member within said C-shaped metal jacket for providing elasticity to said metal jacket.

19. A poppet check valve comprising:

a valve body having a flow passage, a fixed metal valve body seat about said flow passage, and a valve body annular shoulder which extends radially outward of said valve body seat;

a poppet check valve member mounted on said body for reciprocation between open and closed positions relative to said flow passage;

said poppet check valve member having an annular poppet valve member shoulder adjacent said tapered sealing surface;

means for urging said check valve toward a closed seated position on said fixed valve body seat;

said poppet check valve member having a sealing surface which is arranged and designed to engage said metal valve body seat in metal-to-metal sealing relation at a high fluid pressure;

a primary compliant sealing disc positioned radially outward of said valve body seat adjacent said valve body annular shoulder to contact said poppet valve member shoulder in metal-to-metal sealing relation prior to contact of said sealing surface of said poppet valve member with said valve body seat to provide sealing at relatively low fluid pressure; and said compliant sealing member having a secondary disc which abuts said valve body annular shoulder.

* * * * *